W. A. HEUBLEIN.
HAY RACK.
APPLICATION FILED MAY 11, 1908.
1,015,228.
Patented Jan. 16, 1912.
5 SHEETS—SHEET 1.
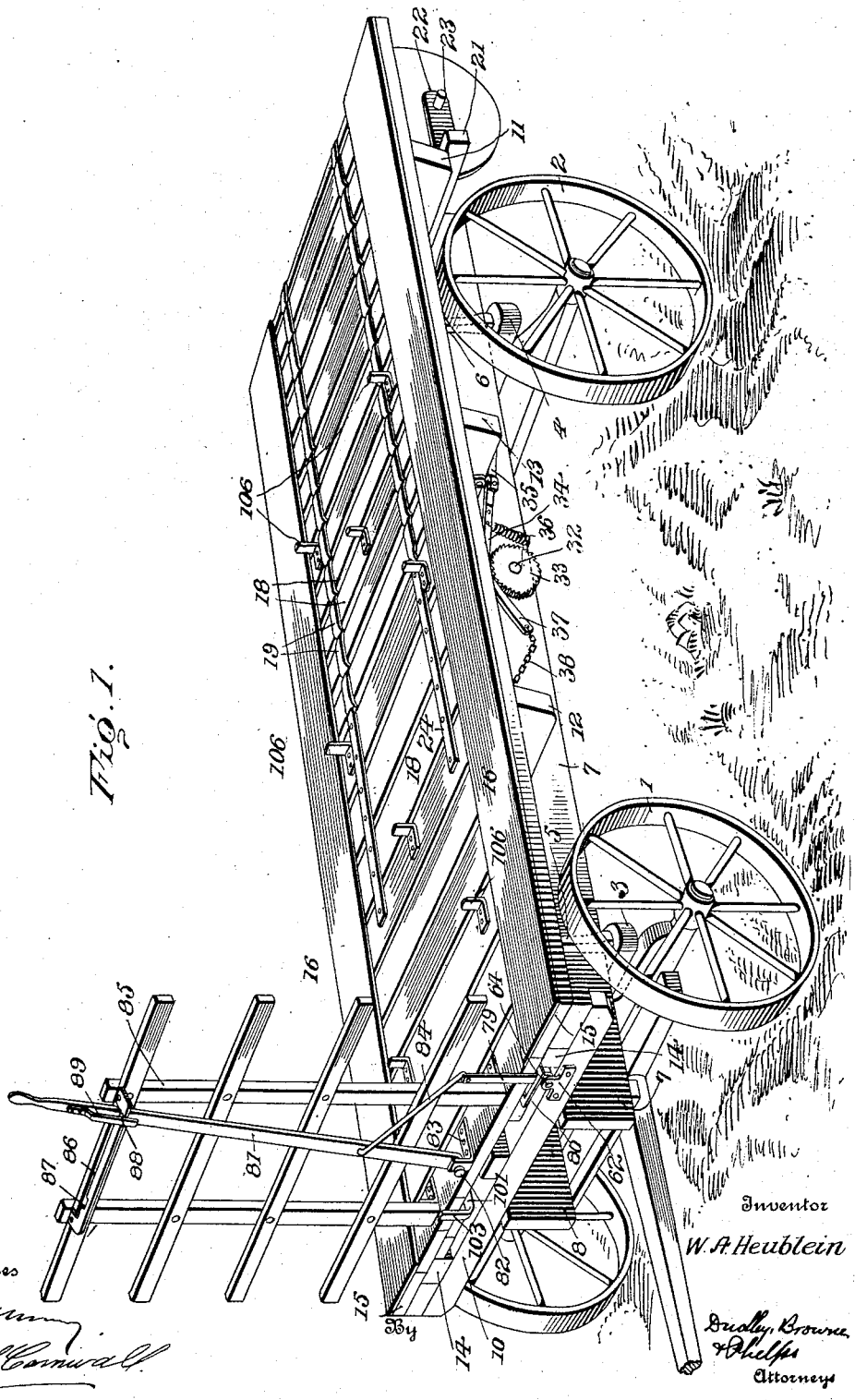
Witnesses
Inventor
W. A. Heublein
By Dudley, Browne & Phelps
Attorneys

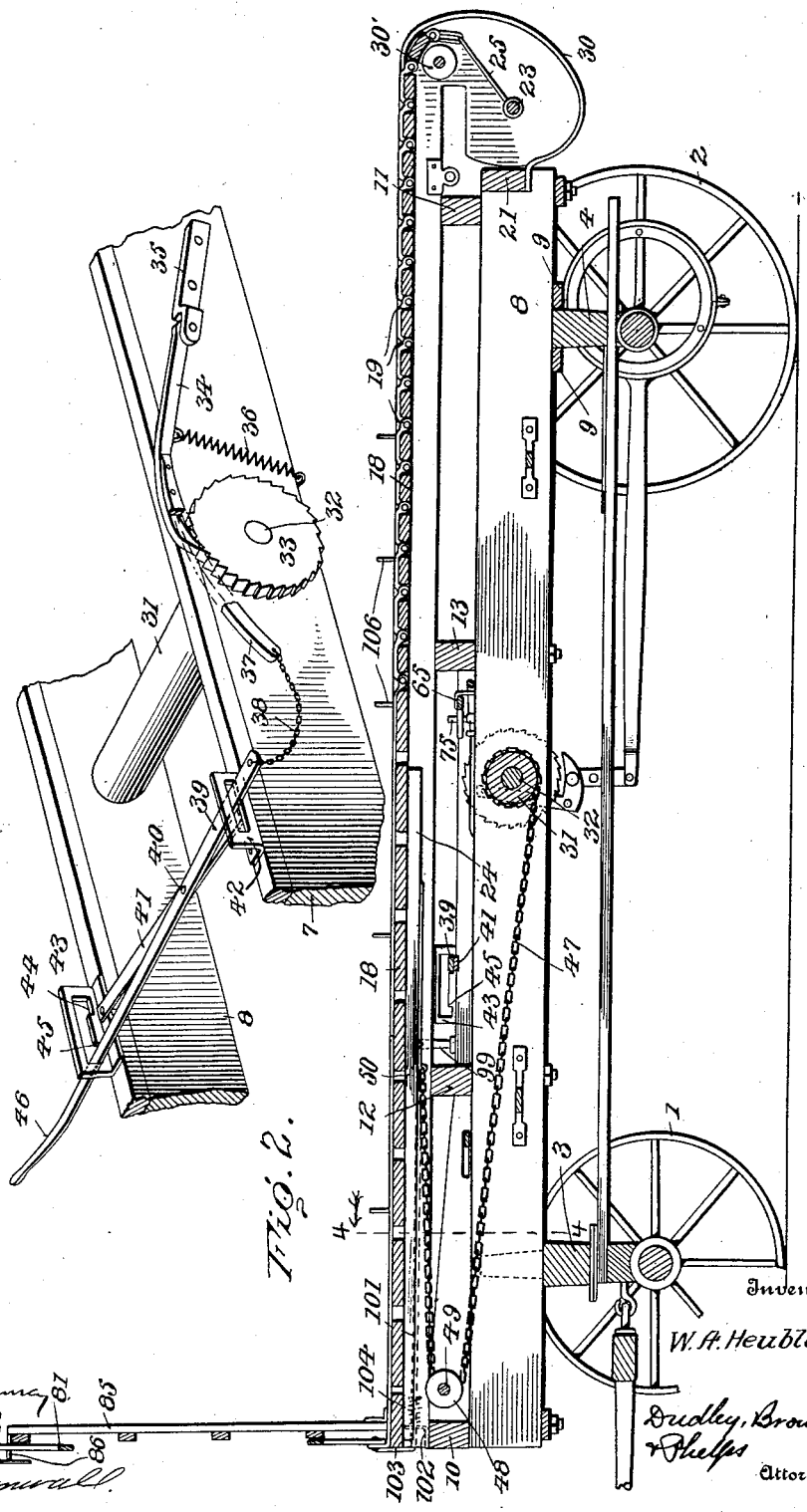

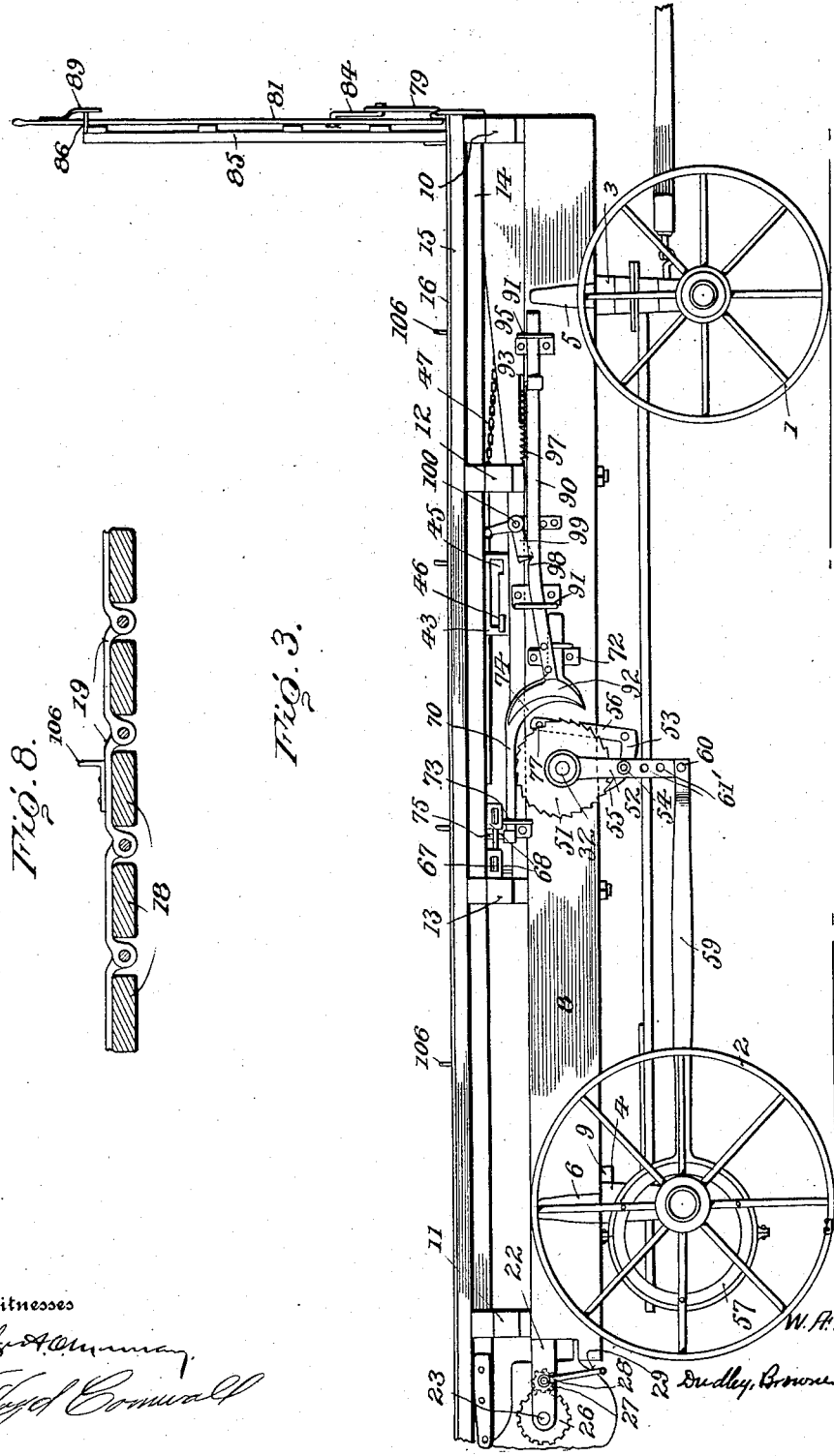

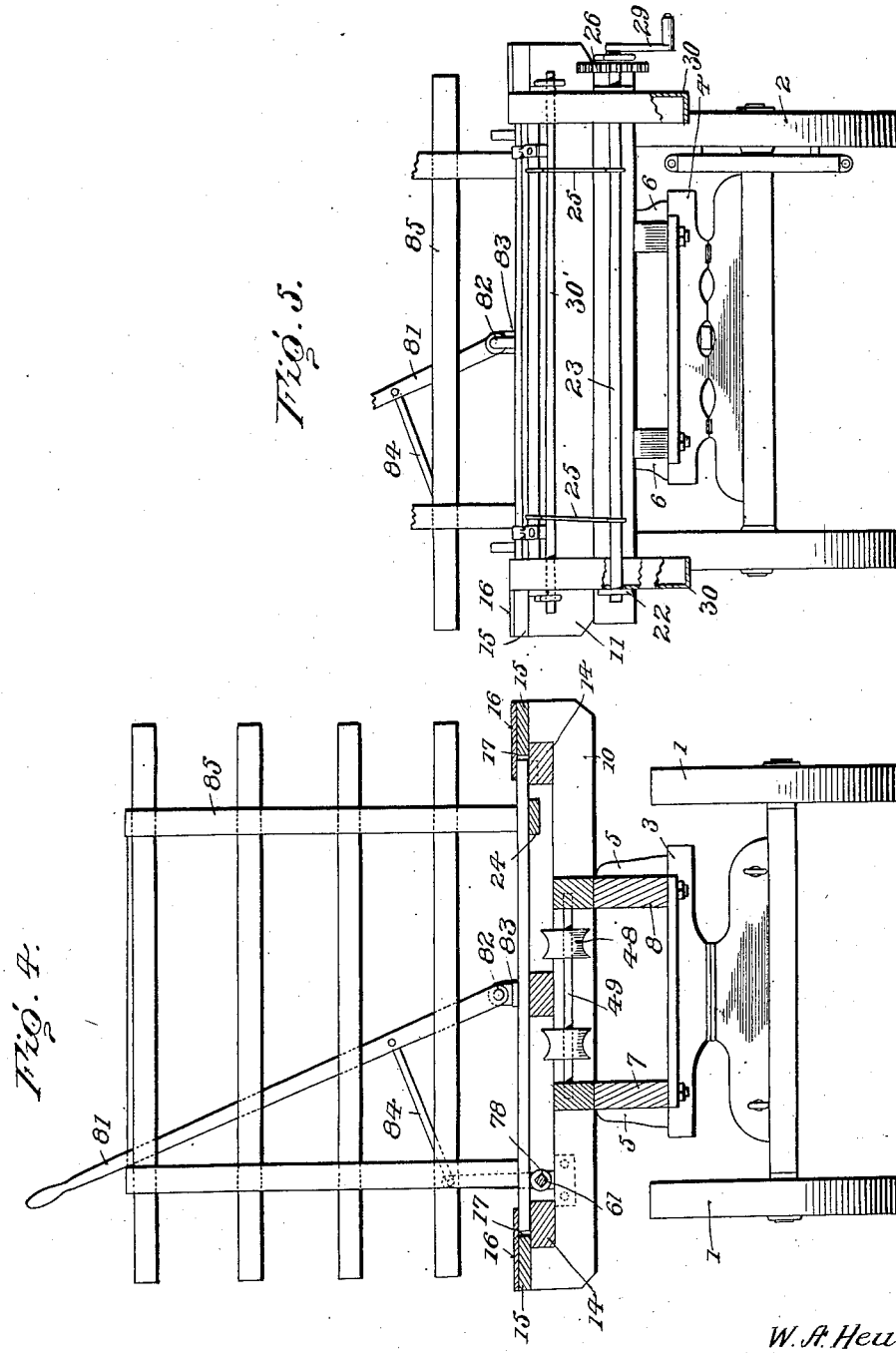

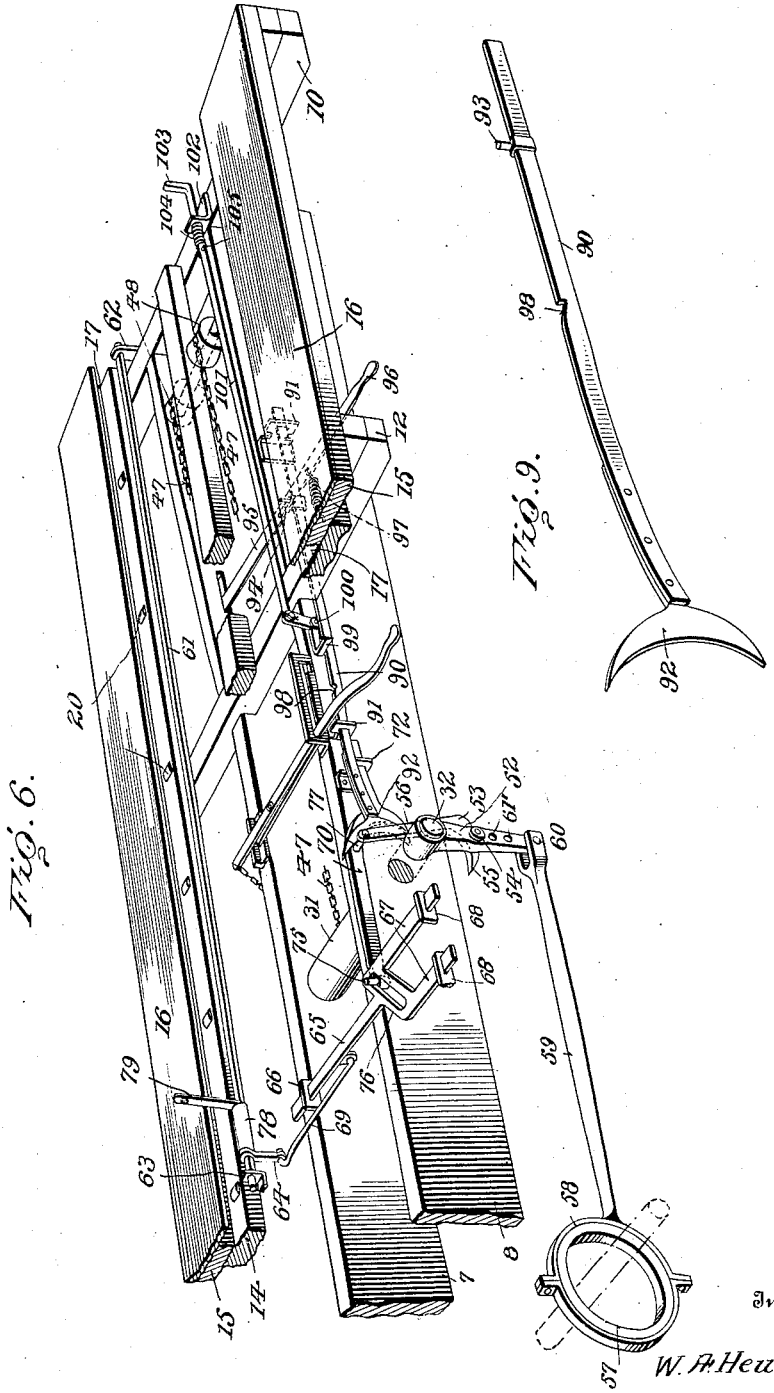

UNITED STATES PATENT OFFICE.

WILLIAM A. HEUBLEIN, OF WILSON, MINNESOTA.

HAY-RACK.

1,015,228.   Specification of Letters Patent.   Patented Jan. 16, 1912.

Application filed May 11, 1908. Serial No. 432,156.

*To all whom it may concern:*

Be it known that I, WILLIAM A. HEUBLEIN, citizen of the United States, residing at Wilson, in the county of Winona and State of Minnesota, have invented certain new and useful Improvements in Hay-Racks, of which the following is a specification.

My invention relates to certain new and useful improvements in hay racks, and the object of my invention is to produce a device of this character that may be placed upon a wagon-body of any ordinary construction and which is adapted to receive the entire load at the rear and as received to move the load forward automatically, whereby the entire rack may be loaded by a loading machine operating at the rear of the rack without the necessity of the hay being handled upon the rack as is now customary.

Another object of my invention is to provide a self-loading rack which is simple in construction, not liable to get out of order and which can be readily controlled by the driver on the rack.

With these and other objects in view, my invention consists in certain constructions, combinations and arrangements of parts, the preferred form of which will be first described in connection with the accompanying drawings and then the invention particularly pointed out in the claims.

Referring to the drawings wherein the same part is designated by the same reference numeral wherever it occurs, Figure 1 is a perspective view of a hay rack embodying my invention; Fig. 2 is a central longitudinal section thereof; Fig. 3 is a side elevation of the side opposite that which is shown in Fig. 1; Fig. 4 is a section taken on line 4, 4 of Fig. 2. Fig. 5 is a rear elevation slightly broken away; Fig. 6 is a perspective view with parts removed and partly broken away showing the parts in their position when the apron is at its extreme rearward position, the apron however not being shown; Fig. 7 is a detail perspective view of the winding drum and some of its controlling mechanisms; Fig. 8 is a detail sectional view of the apron and Fig. 9 is a perspective view of a detail.

The running-gear of the vehicle illustrated is of the usual type employed on farm-wagons, and embodies the usual front and rear wheels 1 and 2, and the usual bolsters 3 and 4 with their standards 5 and 6 near the ends of the bolsters.

The rack is formed with longitudinal side pieces or beams 7, 8, spaced apart so as to just fit between the pairs of standards 5, 6, and held from longitudinal movement on the bolsters by means of the pair of cleats 9, 9, which extend between the side pieces and closely fit the sides of the bolster 4. Secured on top of the beams 7 and 8 at the front, is a cross beam 10, and at the rear a similar cross beam 11. The cross beams 10 and 11 are of the full width of the rack and intermediate the cross-beams 10 and 11 are the beams 12 and 13. Extending from the front to the rear of the rack across the ends of these beams is a pair of stringers 14, 14, and 15, 15 are a pair of side pieces which partly overlap the stringers 14.

16, 16 are a pair of plates secured to the side pieces 15 and projecting beyond the edge of the same, so that a guideway 17 is formed between the top of the stringers 14 and the underside of the plates 16. Into this guideway project the side edges of the floor of the rack. This floor is in the form of a movable apron or conveyer constructed of a series of slats 18 extending across the rack and into the guides 17. Preferably, and as shown, the slats forming the front portion of the floor are connected together by the longitudinally extending slats 24, to form a rigid portion, while the slats forming the rear portion of the floor are flexibly connected together in any desired manner, as by means of the hinges 19 secured to the adjacent slats near each end thereof. Preferably, and as shown, I provide a series of rollers 20, in the upper surfaces of the stringers 14, whereby the floor may be readily moved longitudinally of the rack. Extending across the rear end of the side beams 7 and 8 is a cross-piece 21 from which extend the brackets 22 in which is journaled a shaft 23.

25, 25 are a pair of cords or chains connected at one end to the rear slat of the floor and at the other to the shaft 23. At one end the shaft 23 is provided with a gear 26, with which meshes a gear 27 mounted on the side bracket, the shaft 28 of the gear 27 being provided with a crank 29 by which it can be rotated, whereby the shaft 23 will be rotated and the flexible apron forming the floor wound thereon.

At the rear end of the rack I provide the downwardly curved guiding sections 30 which are, preferably, and as shown, formed as extensions of the plate 16, whereby the flexible apron is guided downwardly and onto the shaft. The apron at the turn passes over the roller 30′ journaled in the sections 30, whereby the apron is prevented from dragging at its turn.

31 is a drum mounted on a shaft 32 journaled in the side beams 7 and 8. Outside the beam 7 the shaft 32 is provided with a ratchet wheel 33 with which one end of a pawl 34 engages, the other end of the pawl being pivoted to a bracket 35 secured to the side of the beam 7.

36 is a spring secured at one end to the pawl and at the other end to the beam 7 to hold the pawl in engagement with the ratchet.

37 is an arm secured to the side of the pawl, and to the outer end of the arm is connected one end of a chain 38, the other end of which is connected to a lever 39 fulcrumed at 40 to a cross piece 41 extending between the beams 7 and 8. On the beam 7 I provide a guide 42 in which one end of the lever 39 works, and on the beam 8 I provide a guide 43 provided with a pair of locking notches 44, 45 into either of which the lever may be latched. The handle portion 46 of the lever extends out beyond the beam 8 in convenient position to be operated. As best shown in Fig. 7, the length of the chain is such that when the lever is latched in the notch 45 the chain will be slack, and the spring 36 consequently permitted to hold the engaging end of the pawl 34 in engagement with the ratchet wheel 33. When, however, the lever is latched in the notch 44, it will, through the chain 38 and the arm 37, lift the pawl out of engagement with the ratchet 33, so that the drum may be free to revolve in either direction.

47, 47 are a pair of chains connected at one end to the drum 31, and extending forward to the front portion of the rack where they pass over a pair of wheels 48, 48 loosely mounted upon a shaft 49 extending between the side beams 7 and 8. The chains then pass back and are fastened in the eyes 50 secured to the underside of the rigid section of the floor. The eyes 50 are placed sufficiently far back from the front end of the floor so as to enable the front of the sections forming the floor to be drawn to the front of the rack.

Fast on the shaft 32, outside the beam 8, is the ratchet wheel 51, and 52 is an arm loosely mounted upon the shaft 32.

53 is a pawl pivoted at 54 to the arm below the ratchet wheel, and having an engaging nose 55 adapted to engage the teeth of the ratchet, and an upwardly projecting arm 56 extending from the end of the pawl opposite the nose. The arm 56 will, by its weight, normally hold the nose 55 of the pawl in engagement with the ratchet wheel.

Secured to one of the rear wheels 2 of the running gear is an eccentric 57 around which passes the strap 58, and from which extends the arm 59 adapted to be secured to the arm 52 by a pin 60 passed through an opening in the end of the arm 59, and through any one of the openings 61′ in the arm 52. The particular opening 61′, through which the pin 60 is passed, will determine the throw of the pawl 53 and consequently the amount of rotation given the shaft 32 and the drum 31 carried thereby.

From the construction thus far described it will be seen that when the back wheel 2 carrying the eccentric 57 is rotated by drawing the rack along the ground the eccentric will operate to rock the arm 52, thus operating through the pawl 53 and ratchet wheel 51 to rotate the drum 31, wind up the chains 47 thereon and draw the floor toward the front of the rack. As the speed with which the floor of the rack should be fed forward is determined by the speed with which the load is delivered to the rack, I have provided means whereby the pawl 53 may be thrown out of engagement with the ratchet 51 whenever desired, so that the feed of the floor may be thereby stopped and started.

61 is a square shaft mounted in bearings 62, 63 carried by the cross pieces 10 and 13 respectively, and extending from the shaft 61 near the bearing 63 is an arm 64.

Slidably mounted at one end in a guide bracket 66 carried by the side beam 7 is a bar 65 which is forked at its other end to provide the forks 67, 67 sliding in bearings 68, 68 projecting down from the underside of the stringer 14.

69 is a link connecting the bar 65 with the arm 64, whereby upon the oscillation of the shaft 61 the bar 65 will be reciprocated.

70 is a curved arm slidably mounted in brackets 72, 73 adjacent its ends and carrying intermediate its ends the curved shoe portions 74. The arm adjacent its rear end is provided with the upwardly extending pin 75 projecting into the inclined slot 76 in the bar 65, said slot being located at the portion of the bar where the same widens out, to form the forks 67. The incline of the slot 76 is such that upon the reciprocation of the bar 65 in the manner previously described the curved bar 70 will be moved longitudinally.

The arm 56 of the pawl 53 carries at its upper end a pin 77 which is adapted to be struck by the curved shoe 74 when the shoe is moved to its rearward position, moving the lower end of the arm 56 forward and upward and, consequently, throwing the nose 55 of the pawl out of engagement with the ratchet.

78 is a square sleeve slidably mounted upon the shaft 61, said sleeve carrying the upwardly projecting arm 79 which passes through a guide bracket 80 extending out from the front of the floor of the rack.

81 is a lever pivoted at 82 in a bracket 83 secured to the top of the floor of the rack and connected to the end of the lever 79 by the link 84. This lever 81 extends up in front of the upright 85, carried by the front end of the floor section, and at its upper end passes through the slotted guide 86 secured to the upright, the guide 86 being provided with the latching notches 87, 88.

89 is a leaf spring secured at one end to the lever 81 and passing over the edge of the guide bracket 86, whereby the lever will be yieldingly held in either the notch 87 or the notch 88 and, consequently, be held in either position.

As the shaft 61 will be oscillated by the movement of the arm 79, it will be seen that an operator standing on front of the rack may, through the connections described, throw the pawl 53 into and out of engagement with the rachet wheel 51, consequently stopping and starting the feed of the floor of the rack as desired.

In order to prevent the floor being fed too far forward by the action of the drum 31, I have provided an automatic trip which, when the front of the floor reaches the front of the rack, will be operated to automatically throw the pawl out of engagement with the ratchet wheel 51 and consequently stop the forward movement of the floor. In the form shown this mechanism consists of a bar 90 shown in detail in Fig. 9, guided in brackets 91 secured to the side of the beam 8. At its rear end the bar 90 carries the curved shoe 92, so located with reference to the pin 77 of the pawl lever 56 that when the bar 90 is in its rearward position it will engage the pin to throw the pawl out of engagement with its ratchet in a manner similar to that described in connection with the shoe 74.

93 is a pin projecting from the bar 90 and engaging a slot 94 formed in a lever 95 pivoted at one end to the side beam 7. The lever 95 extends across the rack and its handle portion 96 projects out in convenient position for operation.

97 is a spring connected at one end to the lever 95 and at the other end to the cross piece 12, whereby the spring normally tends to throw the shoe 92 to its rearward position where it engages the pin 77 and holds the pawl 53 out of engagement with its ratchet.

In the upper face of the bar 90, intermediate of its ends, I form a notch 98 adapted, when the lever is in its forward position, or with its shoe 92 out of engagement with the pin 77, to be engaged by a latch 99, pivoted at 100 to the side of the beam 8. This latch lever, as shown, is in the form of a bell crank, and the other arm of the lever from that which engages the notch, has connected to it a draw rod 101, passing through a bracket 102 extending upwardly from the cross-piece 10. The front end of the draw rod 101 is upturned at 103 and forms a contact with which the front end of the floor engages as the floor reaches to its forward position. When the floor engages the contact 103, it will force the draw rod 101 forward, drawing on the bell crank latch 99, raising the same out of engagement with the notch 98, thus permitting the spring 97 to move the bar 90 to the rear, which causes the shoe 92 to engage the pin 77 and throw the pawl out of engagement with the ratchet 51.

104 is a coil spring mounted on the draw rod 101 between the pin 105, passing through the rod, and the rear face of the bracket 102, whereby the spring will normally force the rod to its rearward position, and when the notch 98 is beneath the latch will force the latch into the notch.

The operation of my hay rack is as follows: Starting with the parts in the position shown in Fig. 1, in which the floor section has moved completely forward, the first operation is to return the floor section to its rear position or, in other words, to roll the rear portion of the same up on the shaft 23. In order to permit this, the lever 46 is moved from the position shown in Fig. 7 to the position where it will be engaged by the notch 44, when the chain 38 will operate through the arm 37 and lift the pawl 34 out of engagement with the ratchet 33. As the pawl 53 is out of engagement with the ratchet 51, at this time due to the operation of the tripping mechanism, the parts are now free, and by turning the crank 29 and rotating the shaft 23 the flexible section of the floor may be rolled up upon the shaft, and the floor moved back until the flexible part of the floor is practically entirely wound upon the shaft. The lever 96 is now moved forward, which moves the shoe 92 out of contact with the pin 77 and places the pawl under the control of the shoe 74, which, as will be remembered, is reciprocated into and out of contact with the pin by means of the lever 81 on the front of the floor. The hay or other material to be loaded is now thrown onto the floor at the rear of the rack until that portion is completely loaded, the rack being drawn along as desired, during this time, without moving the floor. When this portion of the rack has been completely loaded the operator, by means of the lever 81, moves the shoe 74 out of contact with the pin 77 on the pawl lever and thus permitting the pawl to engage the ratchet. Now as the rack is drawn forward the reel 31 will be actuated from the eccentric 57 and through the chains 47, the floor will be drawn forward on the rack. When it has been moved forward a sufficient distance the operator, by means of the lever 81, can throw the pawl out of engagement by its ratchet and stop the movement of the floor. This operation is continued, the load being always deposited at the back of the rack until the rack is completely filled and the floor has moved to the front end of the rack. When the floor reaches this position its front end comes in contact with the upwardly projecting end 103 of the rod 101, which operates to raise the latch 99 out of engagement with the notch 98, permitting the spring 97 to draw the bar 90 to the rear and throw the shoe 92 into contact with the pin 77, throwing the pawl 53 out of engagement with the ratchet 51 and stopping the forward feed of the floor. After the load has been removed the floor is returned to its rearward position and the operation repeated.

In order to hold the hay on the floor sections and to cause it to move forward with the sections I provide on the sections a series of projections 106 which, as shown, are in the form of angle irons which are suitably secured to the sections of the floor. As the hay is loaded onto the rack these projections engage the bottom portion of the load and thus prevent the floor sliding under the hay as it otherwise would.

I realize that considerable variation is possible in the details of construction and arrangement of parts without departing from the spirit of my invention, and I therefore do not intend to limit myself to the specific form shown and described.

I claim—

1. In a self-loading hay rack, the combination with a running gear, of a rack mounted thereon said rack being provided with a floor formed of a flexible section and a non-flexible section, a shaft in the rear of the rack on which the flexible section may be wound, and means connected to the non-flexible section and adapted to draw the floor from its rear position to the front of the rack.

2. In a self-loading hay rack the combination with a running gear, of a rack mounted on said running gear, said rack being provided with a flexible floor, a shaft rotatably mounted on the rack, flexible connectors between the floor and the shaft, a ratchet wheel mounted on the shaft, a pivoted arm, means carried by the running gear for oscillating the arm, a pawl mounted on the arm and adapted to normally engage the ratchet wheel, and means operated by the movement of the floor for moving the pawl out of engagement with the ratchet.

3. In a self-loading hay rack the combination with a running gear, of a rack mounted on said running gear, said rack being provided with a flexible floor, a shaft rotatably mounted on the rack, flexible connectors between the floor and the shaft, a ratchet wheel mounted on the shaft, an eccentric mounted on the running gear, a strap on the eccentric, a pivoted arm, a link connecting the eccentric strap with the pivoted arm whereby the latter is oscillated, a pawl carried by the pivoted arm and adapted to engage the ratchet, a bar carrying a head, a spring normally tending to force the head into engagement with the pawl to throw the same out of engagement with the ratchet, a latch adapted to hold the head out of engagement with the pawl, and a stop adapted to be engaged by the flexible floor to disconnect the latch from the bar.

4. In a self-loading hay rack the combination with a running gear, of a rack mounted on said running gear, the rack being provided with a flexible floor, a shaft rotatably mounted on the rack, flexible connectors between the floor and the shaft, a ratchet whel mounted on the shaft, a pivoted arm, means carried by the running gear for oscillating the arm, a pawl mounted on the arm and adapted to normally engage the ratchet wheel, a reciprocable bar provided with a pawl-engaging head, a pin caried by said bar, a second reciprocable bar provided with a cam slot adapted to be engaged by the pin of the first-mentioned bar, and means for reciprocating said last-mentioned bar to throw the head into and out of engagement with the pawl.

In testimony whereof I affix my signature in presence of two witnesses.

WILLIAM A. HEUBLEIN.

Witnesses:
W. J. SMITH,
D. E. TAWNEY.